United States Patent [19]

Clare, deceased et al.

[11] Patent Number: 5,190,778
[45] Date of Patent: Mar. 2, 1993

[54] FOAM-STABILIZED MALT BEVERAGE

[75] Inventors: Kenneth Clare, deceased, late of Vista, Jean Clare, surviving spouse; Margaret A. Lawson, San Diego, both of Calif.

[73] Assignee: Merck & Co., Inc., Rahway, N.J.

[21] Appl. No.: 527,452

[22] Filed: May 23, 1990
(Under 37 CFR 1.47)

[51] Int. Cl.$^5$ ............................................. C12C 5/02
[52] U.S. Cl. .............................. 426/329; 426/330.4; 426/573; 426/592
[58] Field of Search ............ 426/573, 574, 592, 330.4, 426/329

[56] References Cited

U.S. PATENT DOCUMENTS

| | | |
|---|---|---|
| 3,669,000 | 6/1972 | Segel ................................. 426/592 |
| 3,966,976 | 6/1976 | Schuppner . |
| 4,326,053 | 4/1982 | Kang . |
| 4,503,084 | 3/1985 | Baird ................................. 426/580 |
| 4,517,216 | 5/1985 | Shim ................................. 426/573 |
| 4,563,366 | 1/1986 | Baird ................................. 426/674 |
| 4,647,470 | 3/1987 | Sanderson ........................ 426/574 |
| 4,720,389 | 1/1988 | Clare . |
| 4,729,900 | 3/1988 | Clare . |
| 4,876,105 | 10/1989 | Wolf ................................. 426/576 |

Primary Examiner—Carolyn Paden
Attorney, Agent, or Firm—Charles M. Caruso; Gabriel Lopez; Richard S. Parr

[57] ABSTRACT

A fermented malt beverage having improved foam stability and desirable lace, cling, and clarity is described. The beverage is stabilized by adding 5–400 ppm by weight of gellan gum.

6 Claims, No Drawings

FOAM-STABILIZED MALT BEVERAGE

BACKGROUND OF THE INVENTION

A number of malt beverages or beers will produce a relatively good foam immediately after pouring, but the foams so produced are not as persistent as is usually desired by the consumers of such products. In addition, consumers desire a beer possessing a foam that will "cling" to the insides of a glass or mug in an attractive "lacy" pattern. Lace and cling are difficult to achieve in the presence of slight contaminant levels of surfactants or detergents on the glassware, as occurs when beer mugs or glasses are handwashed and quickly rinsed prior to use. A further requirement is that the beer exhibit good clarity to the consumer, i.e., the absence of any noticeable "haze".

Propylene glycol alginate (PGA), heteropolysaccharide S-10 (see U.S. Pat. No. 3,966,976) and cellulose ether (see U.S. Pat. No. 3,669,00) are additives known to stabilize beer foam.

U.S. Pat. Nos. 4,720,389 and 4,729,900 teach the use of 1) xanthan gum and a galactomannan and 2) xanthan gum and a cold-water soluble protein, respectively, for malt beverage foam stability.

However, continuing research is being conducted in an effort to discover new polymers, additives, and polymer combinations which may be more economical and which can be utilized to impart improved foam stability, lace and clarity to fermented malt beverages while avoiding attendant "haze" levels.

SUMMARY OF THE INVENTION

It has now been found that the foam retention and lace/cling properties of a fermented malt beverage can be stabilized while minimizing haze formation by adding gellan gum to the beverage in an amount sufficient to result in a final concentration in the beverage in the range of about 5–400 ppm, by weight.

DETAILED DESCRIPTION OF THE INVENTION

The term "malt beverage," as used herein, includes such normal foam-forming fermented malt beverages as beer, ale, bock beer, stout, and the like.

By the term "gellan gum", as used herein, is meant the native, fully acylated, extracellularly produced gum made by the heteropolysaccharide-producing bacterium *Pseudomonas elodea*, ATCC 31461, by the whole culture fermentation under a variety of conditions of a medium comprising: a fermentable carbohydrate, a nitrogen source, and other appropriate nutrients. Also included is the clarified form thereof. Gellan gum is also known as S-60.

Processes for producing gellan gum are well-known in the art, e.g., U.S. Pat. No. 4,326,053.

The invention comprises a fermented malt beverage possessing improved foam properties containing gellan gum in an amount of about 5–400 ppm by weight of said beverage.

The invention also comprises a process for preparing a fermented malt beverage of improved foam properties which comprises adding to said beverage 5–400 ppm gellan gum. Preferably, the gum is added as a 0.5 to 1.0% solution by injection counter-current into the fermented beverage before final filtration.

The process of the instant invention produces the subject composition of the invention which is a fermented malt beverage having acceptable foam properties, including desirable foam retention, lace, cling, and acceptable haze values.

The following example illustrates suitable methods of carrying out the invention and should not be regarded as being limiting.

EXAMPLE 1

Foam and Pasteurized Haze Tests

Bulk fermented malt beer samples were tested, utilizing a foamability test according to the following procedures:

1. Test beer, 350 ml, was poured into a 1000 ml vacuum flask, decarbonated under reduced pressure, and brought to room temperature (24° to 25° C.) 0.5% (wt.) gellan gum in de-ionized water was heated to 95° C. for 10 minutes, allowed to cool to room temperature (24° C.) and then added to the beer. The gum was added as an aqueous solution calculated to result in a concentration of 200 ppm by weight in the beer. All glassware used in the procedure was rinsed in chromic sulfuric acid cleaning solution, rinsed well with tap water and then deionized water, and dried at 100° C. before using in the foam test.
2. The initial haze value was measured. The beer was pasteurized by heating to 60° C. and holding at this temperature for 2 hours in a water bath. The beer was chilled to approximately 4.4° C. for 24 hours. The pasteurized haze value was measured after beer was allowed to reach 24° C.
3. The room temperature pasteurized beer of step (2), 25 ml, was transferred into a clean, dry, 50 ml, glass stoppered, graduated cylinder and shaken horizontally and vigorously for 15 seconds.
4. The treated beer was allowed to stand for 30 seconds. The total volume and liquid levels were read. As a measure of foam stability, the volume of foam (in ml) was calculated as the difference between the total and liquid levels. Additional values were again read after 5, 10, 15, 25, and 40 minutes and foam stability calculated.

The data of Table 1—1 were obtained.

TABLE 1-1

| FOAM STABILIZATION OF GELLAN GUM (200 PPM) | | | | | |
|---|---|---|---|---|---|
| Sample | Time (min.) | Tot. (ml) | Liq. (ml) | Foam (ml) | Int. Haze | Past. Haze |
| Control (Blank) | | | | | 2.3 | 2.1 |
| | 0.5 | 40 | 22 | 18 | | |
| | 5 | 37 | 24 | 13 | | |
| | 10 | 37 | 24 | 13 | | |
| | 15 | 37 | 24 | 13 | | |
| | 25 | 36 | 24.5 | 12.5 | | |
| | 40 | 34 | 25 | 9 | | |
| | | | | | 2.5 | 2.1 |
| | 0.5 | 41 | 21 | 20 | | |
| | 5 | 40 | 24 | 16 | | |
| | 10 | 40 | 24 | 16 | | |
| | 15 | 39 | 24 | 15 | | |
| | 25 | 39 | 24.5 | 14.5 | | |
| | 40 | 37 | 25 | 12 | | |
| Gellan Gum | | | | | 3.1 | 3.0 |
| | 0.5 | 40 | 21 | 19 | | |
| | 5 | 39 | 24 | 15 | | |
| | 10 | 39 | 24 | 15 | | |
| | 15 | 39 | 24 | 15 | | |
| | 25 | 39 | 24 | 15 | | |
| | 40 | 39 | 24 | 15 | | |
| | | | | | 3.2 | 3.2 |
| | 0.5 | 42 | 20 | 22 | | |
| | 5 | 41 | 23.5 | 18.5 | | |
| | 10 | 41 | 24 | 17 | | |

TABLE 1-1-continued

FOAM STABILIZATION OF GELLAN GUM (200 PPM)

| Sample | Time (min.) | Tot. (ml) | Liq. (ml) | Foam (ml) | Int. Haze | Past. Haze |
|--------|-------------|-----------|-----------|-----------|-----------|------------|
|        | 15          | 41        | 24        | 17        |           |            |
|        | 25          | 40        | 24        | 16        |           |            |
|        | 40          | 40        | 24        | 16        |           |            |

What is claimed is:

1. A process for improving the foam properties of a fermented malt beverage comprising adding to said beverage gellan gum in an amount of about 5–400 ppm by weight of said beverage.

2. The process of claim 1 wherein said gellan gum is clarified.

3. The process of claim 1 wherein said gellan gum is present in an amount of 40–100 ppm by weight based on said beverage.

4. A fermented malt beverage possessing improved foam properties containing gellan gum in an amount of 5–400 ppm by weight of said beverage.

5. The malt beverage of claim 4 wherein said gellan gum is clarified.

6. The malt beverage of claim 4 wherein said gellan gum is present in an amount of about 40–100 ppm by weight.

* * * * *